(12) United States Patent
Cuppers

(10) Patent No.: US 8,930,102 B2
(45) Date of Patent: Jan. 6, 2015

(54) CONTROL DEVICE OF A VEHICLE

(71) Applicant: ZF Friedrichshafen AG, Friedrichshafen (DE)

(72) Inventor: Ruben Cuppers, Wangen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 106 days.

(21) Appl. No.: 13/674,126

(22) Filed: Nov. 12, 2012

(65) Prior Publication Data
US 2013/0138308 A1 May 30, 2013

(30) Foreign Application Priority Data

Nov. 25, 2011 (DE) .......................... 10 2011 087 126

(51) Int. Cl.
| | |
|---|---|
| B60W 10/11 | (2012.01) |
| F16H 61/02 | (2006.01) |
| F16H 61/08 | (2006.01) |
| F16H 61/684 | (2006.01) |
| F16H 61/04 | (2006.01) |
| F16H 59/18 | (2006.01) |
| F16H 59/20 | (2006.01) |

(52) U.S. Cl.
CPC ........... B60W 10/11 (2013.01); F16H 61/0202 (2013.01); F16H 61/08 (2013.01); F16H 61/684 (2013.01); F16H 61/0437 (2013.01); F16H 2059/183 (2013.01); F16H 2061/0459 (2013.01); F16H 59/20 (2013.01)
USPC .............................. 701/56; 701/51

(58) Field of Classification Search
USPC ............................... 701/57, 56, 51
See application file for complete search history.

(56) References Cited

U.S. PATENT DOCUMENTS 7,574,295 B2 * 8/2009 Frances .......................... 701/57

* cited by examiner

Primary Examiner — John Q Nguyen
Assistant Examiner — Kyung Kim
(74) Attorney, Agent, or Firm — Davis & Bujold, PLLC; Michael J. Bujold

(57) ABSTRACT

A control device of a motor vehicle for controlling a gear change in a transmission of the motor vehicle by generating control signals for transmission shift elements utilized during a gear change. If a gear increment of the gear change to be performed is greater than two gears, and/or if the driver activates a sport gear shift program, and/or if a detection device detects a sporty type of driver, and/or if the driver actuates a kickdown of an accelerator pedal, and/or if the driver actuates the accelerator pedal with a temporal gradient that is greater than a defined limit, the control device generates control signals for the shift elements, being utilized for performing the gear change, with an interruption of driving power, and the control device, in all other instances, generates control signals for the shift elements, being utilized for performing the gear change, without interrupting the tractive force.

3 Claims, 2 Drawing Sheets

CONTROL DEVICE OF A VEHICLE

This application claims priority from German patent application serial no. 10 2011 087 126.8 filed Nov. 25, 2011.

FIELD OF THE INVENTION

The invention relates to a control device of a motor vehicle, particularly a transmission control device. The invention further relates to a method for the control and/or regulation of the execution a gear change in a transmission of a motor vehicle.

BACKGROUND OF THE INVENTION

The main components of a drive train of a motor vehicle are a drive assembly and a transmission, wherein the transmission is connected between the drive assembly and an output drive of the motor vehicle and supplies driving power of the drive assembly at the output drive. The operation of the drive assembly is controlled or regulated by a first control device, specifically an engine control device. The operation of the transmission is controlled or regulated by a second control device, specifically a transmission control device. For this purpose, the engine control device exchanges data with the drive assembly, and the transmission control device exchanges data with the transmission. Furthermore, the engine control device and the transmission control device exchange data with each other.

Transmission control devices known from practice for the control or regulation of a gear change in the transmission of the motor vehicle generate control signals for shift elements of the transmission participating in the execution of the gear change. The shift elements of the transmission can be form-locking shift elements and/or friction shift elements in the form of clutches and/or brakes and/or claws.

Transmission control devices known from practice for the control or regulation of a gear change in the transmission generate control signals for the shift elements participating in the execution of the gear change, such that the gear changes are performed under consideration of topological positive couplings of the drive train without interrupting the driving power at the output drive. This causes relatively long shift times.

With increasing demands on shift dynamics and accordingly increasingly desired shortening of the gear changes, an interruption of the driving power at the output drive must be accepted during the execution of a gear change in the transmission. Up to now, when a control device, particularly a transmission control device, can control or regulate a gear change without interrupting the driving power at the output drive, and also with interruption of the driving power at the output drive, the behavior of the drive train is not comprehensible to the driver. Accordingly, the driver does not comprehend under which conditions, or in which driving situations, a gear change is performed in a transmission with or without interrupting the driving power.

SUMMARY OF THE INVENTION

Proceeding from this background, the problem addressed by the present invention is to create a novel control device of a motor vehicle and a method for control and/or regulation of the execution of a gear change in a transmission of a motor vehicle, which for a driver guarantees a predictable motor vehicle behavior during the performance of gear changes.

This problem is solved by a control device according to the invention, the control device generates control signals for the shift elements of the transmission participating in the gear change for performing the gear change with an interruption of driving power if a gear increment of the gear change to be performed in the transmission is greater than two, and/or if the driver has activated a sport gear shift program, and/or if a driver type detection device detects a sporty type of driver and/or if the driver has actuated a kickdown of the accelerator pedal, and/or if the driver has actuated the accelerator pedal with a temporal gradient that is greater than a defined limit, wherein in all other cases, the control device generates control signals for the shift elements of the transmission participating in the gear change for performing the gear change without interrupting the driving power.

The control device according to the invention for the first time enables a clear distinction between gear changes with an interruption of driving power at the output drive and gear changes without an interruption of driving power at the output drive, in order to provide the driver with behavior of the motor vehicle that is always comprehensible.

According to an advantageous further development, the control device generates control signals for the shift elements of the transmission participating in the gear change for performing the gear change with an interruption of driving power at the output drive if the driver has activated the sport gear shift program or if the driver type detection device detects a sporty type of driver, and if furthermore the driver has actuated a kickdown of the accelerator pedal and/or the driver has actuated the accelerator pedal with a temporal gradient that is greater than a defined limit. The control device preferably generates the control signals for the shift elements of the transmission participating in the gear change for performing the gear change with an interruption of tractive force at the output drive in this case only if furthermore the gear increment of the gear change to be implemented is greater than two. This procedure for controlling and/or regulating shifting with an interruption of driving power at the output drive is particularly preferred.

BRIEF DESCRIPTION OF THE DRAWINGS

Preferred further developments of the invention will become apparent from the description that follows. Embodiments of the invention are explained in greater detail with reference to the drawings, without being limited thereto. The figures show.

DETAILED DESCRIPTION OF THE PREFERRED EMBODIMENTS

The present invention relates to a control device, particularly a transmission control device, of a motor vehicle and a method for controlling and/or regulating the performance of a gear change in a transmission of a motor vehicle.

Figure 1:
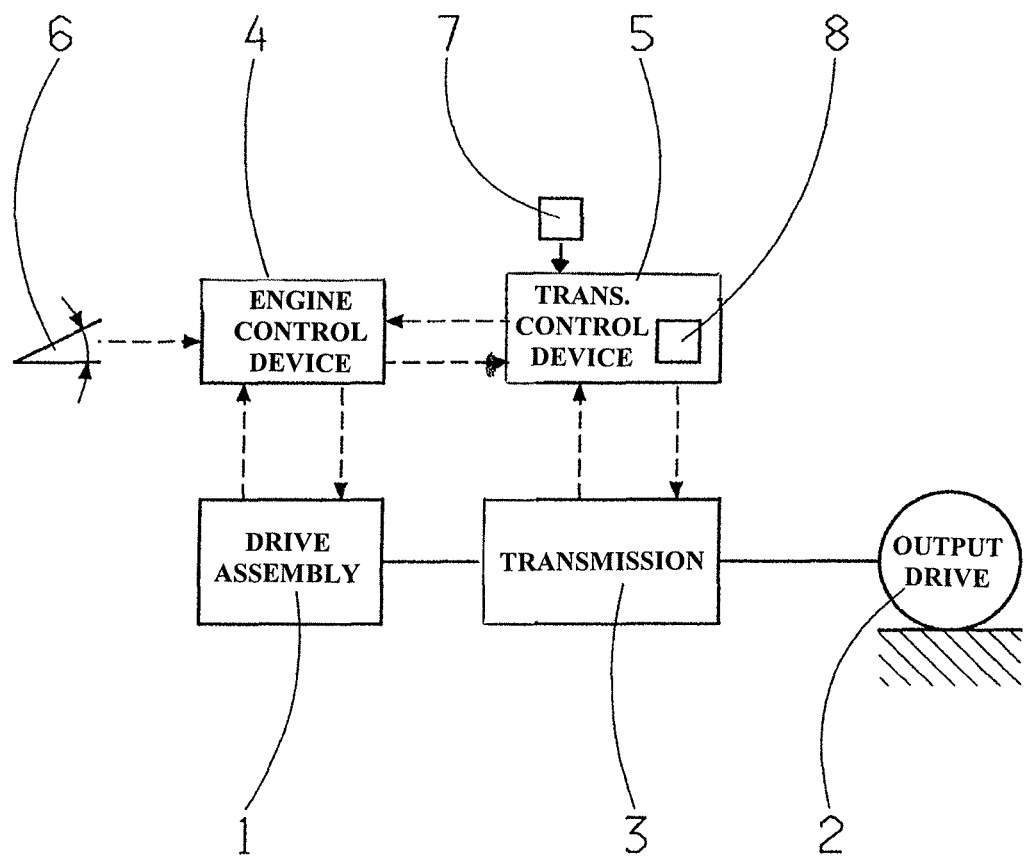
FIG. 1 a diagram of a drive train with a control device according to the invention.

FIG. 1 shows, highly schematically, a drive train of a motor vehicle, which has a drive assembly 1 and a transmission 3 connected between the drive assembly 1 and an output drive 2. The transmission 3 converts rotational speeds and torque, and provides driving power of the drive assembly 1 at the output drive 2.

An engine control device 4 is assigned to the drive assembly 1 in order to control and/or regulate the operation of the drive assembly 1. For this purpose, the engine control device 4 exchanges data with the drive assembly 1 in the sense of the dashed arrows shown in FIG. 1.

The operation of the transmission 3 is controlled and/or regulated by a transmission control device 5 assigned to the transmission 3, wherein the transmission control device 5 exchanges data with the transmission 3 and with the engine control device 4 in the sense of the dashed arrows shown according to FIG. 1.

The transmission 3 comprises in detail shift elements, not shown, for instance friction shift elements and/or form-locking shift elements, wherein friction shift elements are typically implemented as brakes or clutches, and form-locking shift elements are typically implemented as claws. For controlling or regulating a gear change in the transmission 3, the transmission control device 5 generates control signals for shift elements of the transmission 3 participating in performing the gear change.

The control device 5 according to the invention, which is preferably implemented as a transmission control device, generates control signals for the shift elements of the transmission 3 participating in the gear change for performing a gear change with an interruption of driving power at the output drive 2, if a gear increment of the gear change to be implemented in the transmission 3 is greater than two, and/or if the driver has activated a sport gear shift program, and/or if a sporty type of driver is detected, and/or if the driver has actuated a kickdown of an accelerator pedal 6, and/or if the driver has actuated the accelerator pedal 6 with a temporal gradient that is greater than a defined limit.

If at least one of these conditions is fulfilled alone, or alternatively, in combination with another of these conditions, the transmission control device 5 automatically generates control signals for the shift elements of the transmission 3 participating in the gear change for performing the gear change with an interruption of driving power at the output drive 2. In contrast, in all other cases, the control device 5 generates control signals for the shift elements of the transmission 3 participating in the gear change for performing the gear change without an interruption of driving power at the output drive 2.

An activation of a sport gear shift program by the driver can occur for instance using a separate actuating element 7 that is installed for example in the cockpit of a motor vehicle.

The detection of a sporty type of driver preferably occurs using a driver type detection device 8 which is, in particular, a component of the control device 5.

According to a preferred embodiment of the control device 5 according to the invention, the control device generates control signals for the shift elements of the transmission 3 participating in the gear change for performing the gear change with an interruption of driving power at the output drive 2, if the driver has activated the sport gear shift program or if the driver type detection device 8 detects a sporty type of driver, and if furthermore the driver has actuated a kickdown of the accelerator pedal 6 and/or if the driver has actuated the accelerator pedal 6 with a temporal gradient that is greater than a defined limit.

A particularly preferred variant of a control device 5 according to the invention, controls or regulates a gear change with interruption of driving power at the output drive 2 only if furthermore the gear increment of the gear change to be performed is greater than two, thus if the gear step between the actual gear and a target gear of the shift to be implemented or the gear change to be performed is greater than two.

Figure 2:
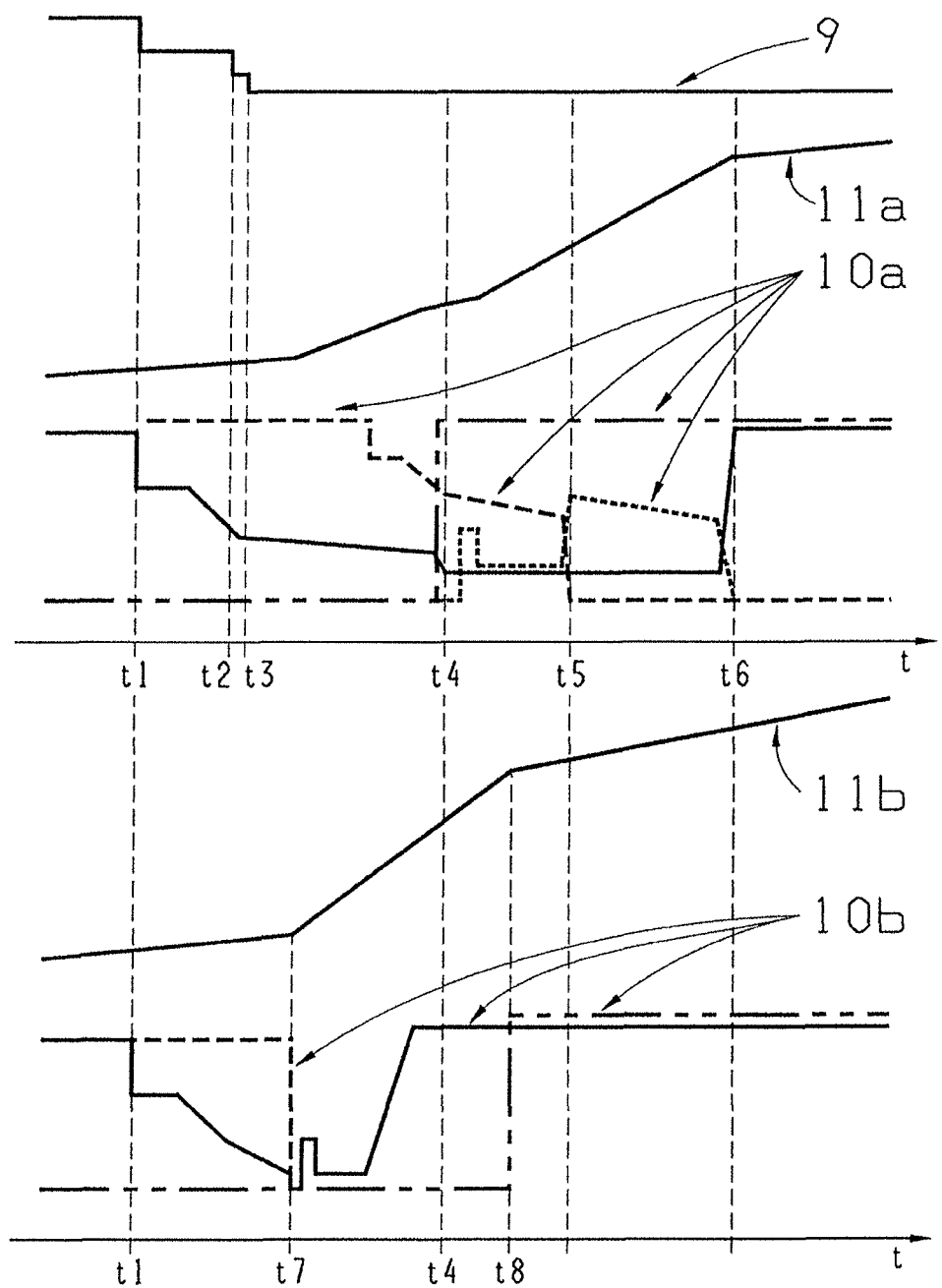
FIG. 2 a diagram for clarifying the function of the control device according to the invention.

Further details of the control device 5 according to the invention or of the method according to the invention arise from FIG. 2, wherein in FIG. 2 different temporal curve progressions are shown over time t. Thus a temporal curve progression 9 visualizes a gear increment request of a gear change to be implemented. In FIG. 2, at time t1 a gear increment of two gear steps is requested for a downshift, and at times t2 and t3 each, a gear increment of a further gear step is requested, thus for instance at time t1, a gear change from 9th gear to 7th gear is to be performed, at time t2 a gear change from 7th gear to 6th gear is to be performed, and at time t3 a gear change from 6th gear to 5th gear is to be performed, so that overall, a gear change from 9th gear to 5th gear is to be performed.

In FIG. 2, several control signals with reference numbers 10a are shown for a total of four shift elements of the transmission 3 participating in performing the gear change, wherein the control signals 10a are generated by the transmission control device 5 such that these serve for performing a gear change without interrupting the driving power at the output drive 2. Thus, between time t1 and t4, a gear change occurs from 9th gear to 7th gear, between time t4 and t5 a gear change occurs from 7th gear to 6th gear, and between time t5 and t6 a gear change occurs from 6th gear to 5th gear, such that the time interval that is required for performing the gear change from 9th gear to 5th gear in the case of performing a shift, or a gear change, without an interruption of driving power at the output drive 2, is specified by the time span between the times t1 and t6. A temporal progression of the rotational speed of the drive assembly arising in this case is visualized by the temporal curve progression 11a in FIG. 2.

If the control device according to the invention as described above generates, depending on the defined criteria described above, control signals for performing a gear change with an interruption of driving power at the output drive 2, the time required for performing the gear change can be shortened, wherein FIG. 2 shows control signals as curve progressions 10b for shift elements of the transmission 3 which participate in performing the gear change from 9th gear to 5th gear with an interruption of driving power at the output drive 2.

FIG. 2 shows that the shift with interruption of the driving power at the output drive 2 is completed at time t8, such that the time required for performing the shift is significantly reduced compared to the shift without an interruption of driving power at the output drive 2. A rotational speed progression of the rotational speed of the drive assembly arising in this case is shown in FIG. 2 by the curve progression 11b. An interruption of the driving power at the output drive 2 develops between the times t7 and t8.

t is accordingly within the meaning of the present invention that a control device, particularly a transmission control device 5, automatically initiates a gear change either with an interruption of driving power or without interruption of driving power at the output drive 2 depending on defined operating conditions of the drive train, specifically by providing appropriate control signals for the shift elements of the transmission 3 participating in performing the gear change. As a result, a clear distinction on the control side between triggering, or controlling or regulating a gear change with or without an interruption of the driving power at the output drive 2 is guaranteed, wherein the details of the invention are used preferably for downshifts. Alternatively, it is possible to use the details of the invention also for upshifts.

REFERENCE CHARACTERS 1 drive assembly
2 output drive
3 transmission
4 engine control device 5 transmission control device
6 accelerator pedal
7 actuation device
8 driver type detection device
9 gear increment request curve progression
10a shift element control curve progression
10b shift element control curve progression
11a engine speed curve progression
11b engine speed curve progression

The invention claimed is:

1. A control device of a motor vehicle which, for either controlling or regulating a gear change in a transmission of the motor vehicle, generates control signals for shift elements of the transmission participating in performing the gear change,
the control device generating control signals for the shift elements of the transmission participating in the gear change for performing the gear change with an interruption of driving power when:
a gear increment of the gear change to be implemented in the transmission is greater than two, and
there is a kickdown actuation of an accelerator pedal by a driver, and
there is an actuation of the accelerator pedal by the driver with a temporal gradient that is greater than a defined limit, and
either a sport gear shift program is activated by the driver or a driver type detection device detects a sporty type of driver, and
the control device, in all other instances, generating control signals for the shift elements of the transmission participating in the gear change for performing the gear change without interrupting the driving power.

2. A method for at least one of controlling and regulating the performance of a gear change in a transmission of a motor vehicle, the method comprising the steps of:
generating control signals, for either controlling or regulating the gear change, for shift elements of the transmission participating in performing the gear change,
generating the control signals for the shift elements of the transmission participating in the gear change for performing the gear change with an interruption of driving power, when:
a gear increment of the gear change to be implemented is greater than two, and
there is a kickdown actuation of an accelerator pedal by a driver, and
the accelerator pedal is actuated by the driver with a temporal gradient that is greater than a defined limit, and
either a sport gear shift program is activated by the driver or a driver type detection device detects a sporty type of driver, and
otherwise generating alternate control signals for the shift elements of the transmission participating in the gear change for performing the gear change without an interruption of the driving power.

3. A method of controlling a gear change in a transmission of a motor vehicle with a control device which communicates with an accelerator pedal, a drive assembly, a shift program actuating element and a driver type detection device, the method comprising the steps of:
detecting a gear change request;
exchanging data between the control device and at least one of the accelerator pedal, the drive assembly, the shift program actuating element and the driver type detection device;
generating first control signals with the control device if the data, exchanged between the control device and at least one of the accelerator pedal, the drive assembly, the shift program actuating element and the driver type detection device, indicates:
the gear change request is a request for a change of more than two gear increments, and
actuation of a kickdown actuation of the accelerator pedal by a driver, and
actuation of the accelerator pedal by the driver with a temporal gradient that is greater than a defined limit, and
either a sport gear shift program is activated by the driver or the driver type detection device detects a sporty type of driver;
transmitting the first control signals to shift elements of the transmission participating in the gear change to change gears with an interruption of driving power passing to an output drive of the motor vehicle; and
generating second control signals with the control device if the control device fails to generate the first control signals and transmitting the second control signals to the shift elements to change gears with the driving power continuously passing to the output drive of the motor vehicle.

* * * * *